United States Patent
Vajapeyam et al.

(10) Patent No.: US 9,629,123 B2
(45) Date of Patent: Apr. 18, 2017

(54) SYSTEMS AND METHODS FOR ENHANCING UPLINK COVERAGE IN INTERFERENCE SCENARIOS

(71) Applicant: QUALCOMM Incorporated, San Diego, CA (US)

(72) Inventors: Madhavan Srinivasan Vajapeyam, San Diego, CA (US); Hao Xu, San Diego, CA (US); Tingfang Ji, San Diego, CA (US); Osok Song, San Diego, CA (US); Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 125 days.

(21) Appl. No.: 14/226,334

(22) Filed: Mar. 26, 2014

(65) Prior Publication Data
US 2014/0204889 A1 Jul. 24, 2014

Related U.S. Application Data

(62) Division of application No. 13/110,280, filed on May 18, 2011, now Pat. No. 8,761,097.
(Continued)

(51) Int. Cl.
*H04W 72/04* (2009.01)
*H04W 16/10* (2009.01)
(Continued)

(52) U.S. Cl.
CPC ............ *H04W 72/04* (2013.01); *H04L 5/0092* (2013.01); *H04W 16/10* (2013.01); *H04W 28/18* (2013.01);
(Continued)

(58) Field of Classification Search
None
See application file for complete search history.

(56) References Cited

U.S. PATENT DOCUMENTS 8,761,097 B2 6/2014 Vajapeyam et al.
2005/0069022 A1 3/2005 Agrawal
(Continued)

FOREIGN PATENT DOCUMENTS

CN 101150835 A 3/2008
JP 2011504062 A 1/2011
(Continued)

OTHER PUBLICATIONS

Huawei, LTE-non-Ca based HeNet support, Apr. 2010, 3GPP TSG RAN WG1 meeting#60bis, R1-101982, pp. 7.*
(Continued)

*Primary Examiner* — Sulaiman Nooristany
(74) *Attorney, Agent, or Firm* — Linda Gunderson (57) ABSTRACT

A method and apparatus are for communication in a wireless network in which a User Equipment (UE) associated with a first evolved Node B (eNB) experiences interference from a second eNB. The method includes negotiating by the first eNB of the wireless network with a second eNB of the wireless network for a partitioning of subband resources on an uplink. A first subset of subband resources is assigned to the first eNB, and a second subset of subband resources is assigned to the second eNB. A method and apparatus are for communication in a wireless network. The method includes decoding a downlink control channel received during a protected downlink subframe to determine an uplink subframe n containing a protected subband for uplink transmission. The method also includes transmitting data during the uplink subframe n on the protected subband.

12 Claims, 7 Drawing Sheets

Related U.S. Application Data (60) Provisional application No. 61/346,127, filed on May 19, 2010.

(51) Int. Cl.
*H04W 28/18* (2009.01)
*H04W 72/12* (2009.01)
*H04L 5/00* (2006.01)

(52) U.S. Cl.
CPC ......... *H04W 72/042* (2013.01); *H04W 72/12* (2013.01); *H04W 72/0426* (2013.01); *H04W 72/0453* (2013.01)

(56) References Cited

U.S. PATENT DOCUMENTS

| | | |
|---|---|---|
| 2009/0131065 A1 | 5/2009 | Khandekar et al. |
| 2009/0247084 A1 | 10/2009 | Palanki |
| 2009/0247181 A1 | 10/2009 | Palanki et al. |
| 2009/0325626 A1 | 12/2009 | Palanki et al. |
| 2011/0051654 A1* | 3/2011 | Blankenship ........ H04B 7/2606 370/315 |
| 2011/0085457 A1 | 4/2011 | Chen et al. |
| 2011/0211503 A1 | 9/2011 | Che et al. |
| 2011/0249642 A1 | 10/2011 | Song et al. |
| 2011/0275394 A1 | 11/2011 | Song et al. |
| 2011/0286407 A1 | 11/2011 | Vajapeyam et al. |
| 2014/0247790 A1 | 9/2014 | Vajapeyam et al. |

FOREIGN PATENT DOCUMENTS

| | | |
|---|---|---|
| JP | 2011517896 A | 6/2011 |
| JP | 2011526468 A | 10/2011 |
| WO | 2009065075 A1 | 5/2009 |
| WO | WO-2009065075 A1 | 5/2009 |
| WO | 2009120934 A1 | 10/2009 |
| WO | 2009158546 A1 | 12/2009 |

OTHER PUBLICATIONS

3rd Generation Partnership Project;Technical Specification Group Radio Access Network; Evolved UTRA and UTRAN; Radio Access Architecture and Interfaces (Release 7) 3GPP DRAFT ; TR_R3018_V_100. 3rd Generation Partnership Project (3GPP), Mobile Competence Centre ; 650, Route Des Lucioles ; F-06921 Sophia-Antipolis Cedex ; France, vol . RAN WG3, Oct. 12, 2007 , XP050143278, [ retrieved on Oct. 12, 2007] paragraphs [6.12.5.1], [6.12.5.2].
Catt: "Considerations on Interference Coordination in Het-Net", 3GPP DRAFT; R1-100902, 3rd Generation Partnership Project (3GPP), Mobile Competence Centre ; 650, Route Des Lucioles ; F-06921 Sophia-Antipolos Cedex ; France, vol. RAN WGI, no. San Francisco, USA; Feb. 22, 2010, Feb. 16, 2010, XP050418504, [retrieved on Feb. 16, 2010].
Huawei: "LTE non-CA based HetNet support", 3GPP DRAFT; R1-101982, 3rd Generation Partnership Project (3GPP), Mobile Competence Centre ; 650, Route Des Lucioles ; F-06921 Sophia-Antipolis Cedex ; France, vol. RAN WG1, no. Beijing, china; Apr. 12, 2010, Apr. 6, 2010, XP050419319, [retrieved on Apr. 6, 2010].
International Search Report and Written Opinion—PCT/US2011/037193—ISA/EPO—Jul. 28, 2011.
LG Electronics: "Considerations on interference coordination in heterogeneous networks", 3GPP DRAFT ; R1-101369, 3rd Generation Partnership Project (3GPP), Mobile Competence Centre; 650, Route Des Lucioles ; F-06921 Sophia-Antipolis Cedex ; France, vol. RAN WGI, no. San Francisco, USA; Feb. 22, 2010-Feb. 26, 2010, Feb. 16, 2010, XP050418854, pp. 1-5.
Qualcomm Incorporated: "Techniques to Cope with High Interference in Heterogeneous Networks," 3GPP TSG-RAN WG1#59bis, 3GPP, R1-100702, Jan. 22, 2009.
NTT DOCOMO, "Performance Evaluations of Heterogeneous Networks", 3GPP TSG RAN WG1 Meeting #60, R1-101226, Feb. 26, 2010, pp. 1-18.
3rd Generation Partnership Project;Technical Specification Group Radio Access Network; Evolved UTRA and UTRAN;Radio Access Architecture and Interfaces (Release 7) 3GPP DRAFT ; TR_R3018_V_100. 3rd Generation Partnership Project (3GPP), Mobile Competence Centre ; 650, Route Des Lucioles ; F-06921 Sophia-Antipolis Cedex ; France, vol. RAN WG3, Oct. 12, 2007 , XPO50143278, [ retrieved on Oct. 12, 2007] paragraphs [6.12.5.1], [6.12.5.2].
Catt: "Considerations on Interference Coordination in Het-Net", 3GPP DRAFT; R1-100902, 3rd Generation Partnership Project (3GPP), Mobile Competence Centre ; 650, Route Des Lucioles ; F-06921 Sophia-Antipolis Cedex ; France, vol. RAN WGI, no. San Francisco, USA; Feb. 22, 2010, Feb. 16, 2010, XP050418504, [retrieved on Feb. 16, 2010].
LG Electronics: "Considerations on interference coordination i n heterogeneous networks" 3GPP DRAFT ; R1-101369 Interference Coordination I N Hetnet V2, 3rd Generation Partnership Project (3GPP), Mobile Competence Centre ; 650, Route Des Lucioles ; F-06921 Sophia-Antipolis Cedex ; France, vol. RAN WGI, no. San Francisco, USA; Feb. 22, 2010, Feb. 16, 2010, XP050418854, [retrieved on 2010-02-161 paragraph [0001]—paragraph [03.1].

* cited by examiner

SYSTEMS AND METHODS FOR ENHANCING UPLINK COVERAGE IN INTERFERENCE SCENARIOS

CROSS-REFERENCE TO RELATED APPLICATION

This application is a divisional application of Ser. No. 13/110,280 filed May 18, 2011 and claims the benefit under 35 U.S.C. §119(e) to U.S. Provisional Patent Application No. 61/346,127 entitled "SYSTEMS AND METHODS FOR ENHANCING UPLINK COVERAGE IN INTERFERENCE SCENARIOS," filed on May 19, 2010, the disclosure of which is expressly incorporated by reference herein in its entirety.

BACKGROUND

1. Field

Aspects of the present disclosure relate generally to wireless communication systems, and more particularly to enhancing uplink (UL) coverage in interference scenarios.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to one aspect, a method for communication in a wireless network in which a User Equipment (UE) associated with a first evolved Node B (eNB) experiences interference from a second eNB is described. The method includes negotiating by a first evolved Node B (eNB) of the wireless network with a second eNB of the wireless network for a partitioning of subband resources on an uplink. In one aspect, a first subset of subband resources is assigned to the first eNB, and a second subset of subband resources is assigned to the second eNB.

In another aspect, an apparatus for communication in a wireless network in which a User Equipment (UE) associated with a first evolved Node B (eNB) experiences interference from a second eNB is described. The first eNB include means for negotiating with a second eNB of the wireless network for a partitioning of subband resources on an uplink. In one aspect, a first subset of subband resources is assigned to the first eNB, and a second subset of subband resources is assigned to the second eNB. The first eNB may also includes means for communicating in accordance with the negotiated resources.

In another aspect, a computer program product for communication in a wireless network in which a User Equipment (UE) associated with a first evolved Node B (eNB) experiences interference from a second eNB is described. The computer program product includes a computer-readable medium having program code recorded thereon. The computer program product has program code to negotiate by a first evolved Node B (eNB) of the wireless network with a second eNB of the wireless network for a partitioning of subband resources on an uplink. In one aspect, a first subset of subband resources is assigned to the first eNB, and a second subset of subband resources is assigned to the second eNB.

In yet another aspect, an apparatus for communication in a wireless network in which a User Equipment (UE) associated with a first evolved Node B (eNB) experiences interference from a second eNB is described. A first evolved Node B (eNB) includes at least one processor; and a memory coupled to the at least one processor. The processor(s) is configured to negotiate with a second eNB of the wireless network for a partitioning of subband resources on an uplink. In one aspect a first subset of subband resources is assigned to the first eNB, and a second subset of subband resources is assigned to the second eNB.

In one aspect, a method for user equipment (UE) communication in a wireless network is described. The method includes decoding a downlink control channel received during a protected downlink subframe to determine an uplink subframe n containing a protected subband for uplink transmission. In one aspect, the UE transmits data during the uplink subframe n on the protected subband.

In a further aspect, an apparatus for user equipment (UE) communication in a wireless network is described. The apparatus includes means decoding a downlink control channel received during a protected downlink subframe to determine an uplink subframe n containing a protected subband for uplink transmission. In one aspect, the apparatus includes means for transmitting data during the uplink subframe n on the protected subband.

In another aspect, a computer program product for communication in a wireless network is described. The computer program product includes a computer-readable medium having program code recorded thereon. The computer program product has program code to decode a downlink control channel received during a protected downlink subframe to determine an uplink subframe n containing a protected subband for uplink transmission. The computer program product also has program code to transmit data during the uplink subframe n on the protected subband.

In yet another aspect, a User Equipment (UE) for communication in a wireless network is described. The UE includes at least one processor; and a memory coupled to the at least one processor. The processor is configured to decode a downlink control channel received during a protected downlink subframe to determine an uplink subframe n containing a protected subband for uplink transmission. The processor is further configured to transmit data during the uplink subframe n on the protected subband.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
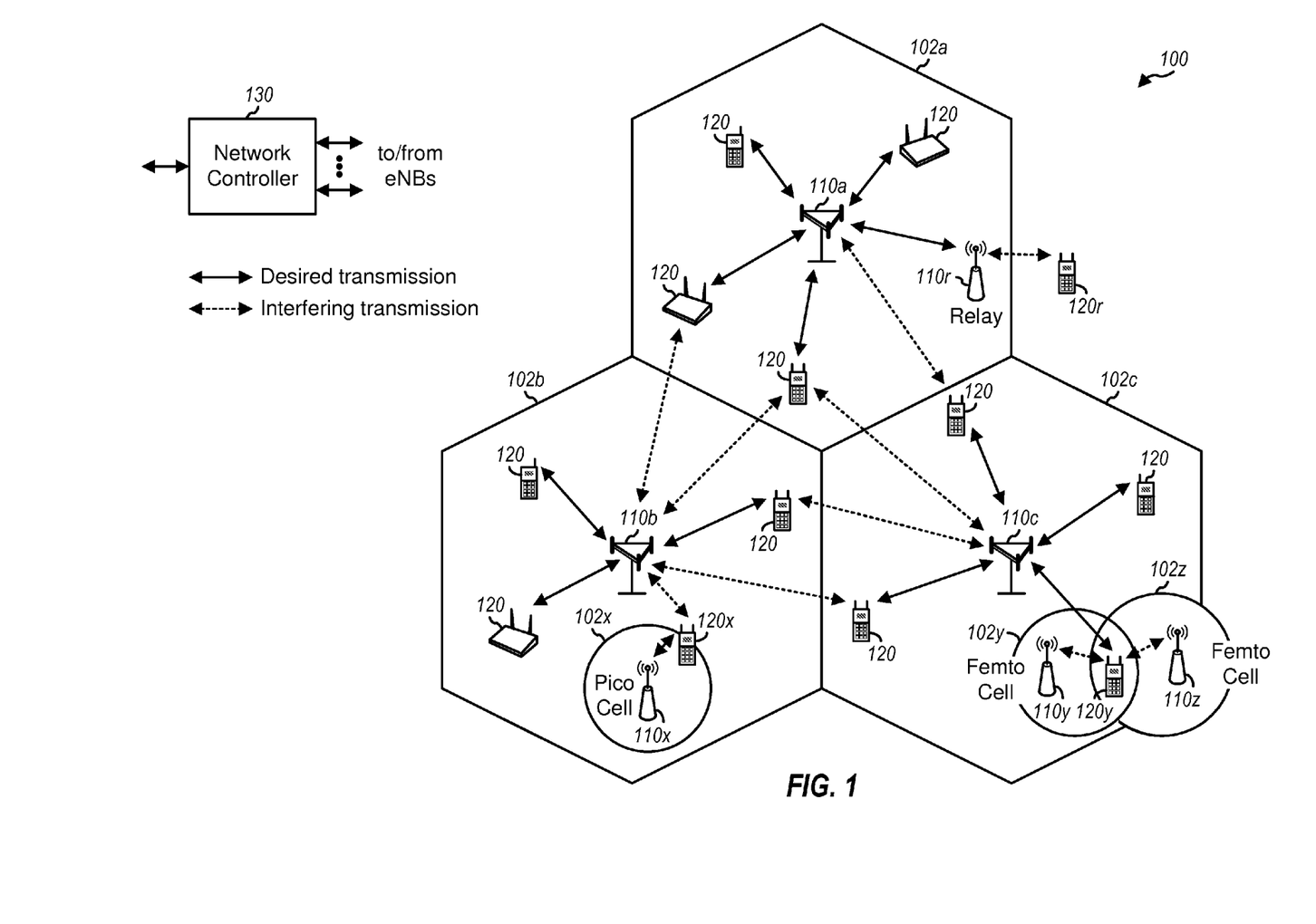
FIG. 1 is a block diagram conceptually illustrating an example of a telecommunications system.

FIG. 1 shows a wireless communication network 100, which may be an LTE-A network, in which systems and methods for enhancing uplink coverage in interference scenarios may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
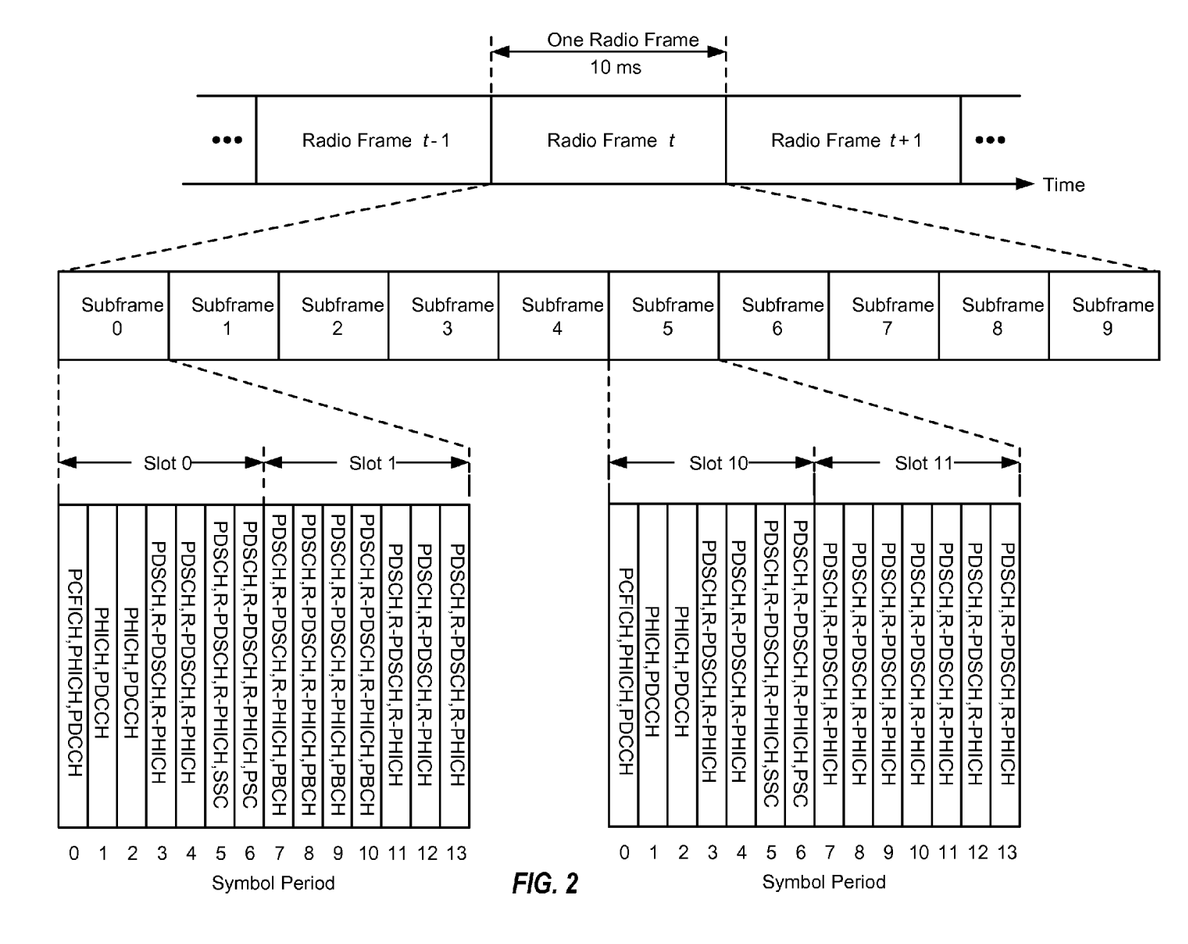
FIG. 2 is a block diagram conceptually illustrating an exemplary frame structure in downlink Long Term Evolution (LTE) communications.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c with lower received power (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink.

When operating in the connected mode, the UE 120y may experience so much interference in this dominant interference scenario that it may no longer be able to maintain a acceptable connection with the eNB 110c, for example. The analysis of interference by the UE 120y includes obtaining the signal quality, such as by calculating the error rate of the PDCCH received on the downlink from the eNB 110c. Alternatively, the error rate of the PDCCH may be predicted based on the signal-to-noise ratio (SNR) of the PDCCH. If the error rate of the PDCCH, as calculated by the UE 120y, reaches a predefined level, the UE 120y will declare a radio link failure (RLF) to the eNB 110c and end the connection. At this point, the UE 120y may attempt to reconnect to the eNB 110c or possibly attempt to connect to another eNB with a stronger signal.

A dominant interference scenario may also occur due to range extension, which is a scenario in which a UE connects to an eNB with lower path loss and lower SNR among all eNBs detected by the UE. For example, in FIG. 1, the UE 120x may detect the macro eNB 110b and the pico eNB 110x and may have lower received power for the eNB 110x than the eNB 110b. Nevertheless, it may be desirable for the UE 120x to connect to the pico eNB 110x if the path loss for the eNB 110x is lower than the path loss for the macro eNB 110b. This may result in less interference to the wireless network for a given data rate for the UE 120x.

With range extension enabled in a wireless network, such as the wireless network 100, in order for UEs to obtain service from a lower power base station (i.e., a pico or femto base station) in the presence of a macro base station with stronger downlink signal strength, or for the UEs to obtain service from a macro base station in the presence of a strongly interfering signal from a femto base station to which the UE is not authorized to connect, an enhanced inter-cell interference coordination (eICIC) is used to coordinate the interfering base station giving up some resources in order to enable control and data transmissions between the UE and the serving base station. When a network supports eICIC, the base stations negotiate with each other to coordinate resources in order to reduce/eliminate interference by the interfering cell giving up part of its resources. With this, a UE can access the serving cell even with severe interference by using the resources yielded by the interfering cell.

For example, a coverage lapse within a macro cell may exist when a femto cell with a closed access mode, in which only member femto UEs may access the cell, lies within the coverage area of the macro cell. By making this femto cell yield some of its resources, the UE within the femto cell coverage area may access its serving macro cell by using the resources from the femto cell. In a radio access system using OFDM such as E-UTRAN, these yielded resources may be time-based, frequency-based, or a combination of both. When the yielded resources are time-based, the interfering cell refrains from using some of its accessible subframes in the time domain. When these resources are frequency-based, the interfering cell does not use some of its accessible subcarriers in the frequency domain. When the yielded resources are a combination of both frequency and time, the interfering cell does not use the resources defined by frequency and time.

For a UE that supports eICIC, the existing criteria for analyzing RLF conditions may not satisfactorily address the conditions of the coordinating cells. When this UE lies in a region with severe interference where the interference is coordinated between base stations by the interfering cell giving up part of its resources, the UE measurement of the SNR or the decoding error rate of PDCCH would vary considerably, depending on whether the resources were yielded by the interfering cell or not. When the UE measures the SNR or the decoding error rate of the PDCCH for the resources which were not yielded by the interfering cell, the UE can erroneously declare an RLF due to high interference, although the UE can still access the serving cell using the resources yielded by the interfering cell.

Figure 3:
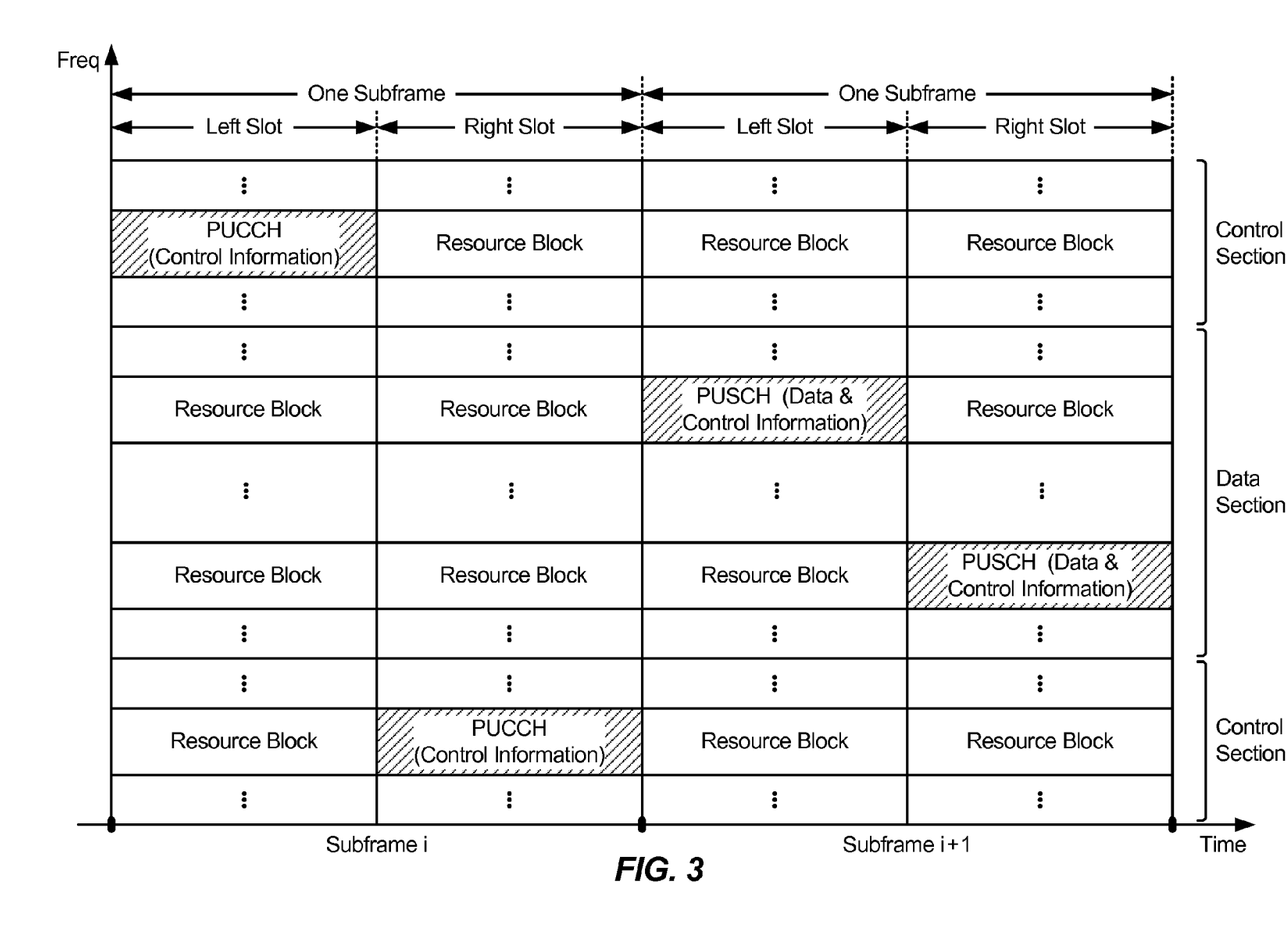
FIG. 3 is a block diagram conceptually illustrating an exemplary frame structure in uplink Long Term Evolution (LTE) communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the uplink resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

LTE is a set of enhancements to the Universal Mobile Telecommunications System (UMTS), which was introduced in 3GPP Release 8 (referred to hereafter as "Release 8"). The LTE specification provides downlink peak rates of at least 100 Mbps, an uplink of at least 50 Mbps and radio access network (RAN) round-trip times of less than 10 ms. LTE supports scalable carrier bandwidths, from 20 MHz down to 1.4 MHz and supports both frequency division duplexing (FDD) and time division duplexing (TDD).

Part of the LTE standard is the System Architecture Evolution, a flat IP-based network architecture designed to replace the GPRS Core Network and ensure support for, and mobility between, some legacy or non-3GPP systems, for example GPRS and WiMax respectively.

LTE uses OFDM for the downlink (or "DL"). OFDM meets the LTE requirement for spectrum flexibility and enables cost-efficient solutions for very wide carriers with high peak rates. It is a well-established technology, for example in standards such as IEEE 802.11a/g, 802.16, HIPERLAN-2, DVB and DAB.

As discussed in FIG. 2, conventionally in the time domain of LTE there is a radio frame that is 10 ms long and has 10 subframes of 1 ms each. Every subframe may have 2 slots where each slot is 0.5 ms. The subcarrier spacing in the frequency domain is 15 kHz. Twelve of these subcarriers together (per slot) is called a resource block so one resource block is 180 kHz. Six resource blocks fit in a carrier of 1.4 MHz, and 100 resource blocks fit in a carrier of 20 MHz.

In the downlink there are three main physical channels. The Physical Downlink Shared Channel (PDSCH) is used for all the data transmission, the Physical Multicast Channel (PMCH) is used for broadcast transmission using a Single Frequency Network, and the Physical Broadcast Channel (PBCH) is used to send system information within the cell. Supported modulation formats on the PDSCH are QPSK, 16QAM and 64QAM.

In the uplink, for the Physical Uplink Shared channel (PUSCH) only, LTE uses a pre-coded version of OFDM called Single Carrier Frequency Division Multiple Access (SC-FDMA). This is to compensate for a drawback with normal OFDM, which has a very high peak-to-average power ratio (PAPR). High PAPR requires expensive and inefficient power amplifiers with high requirements on linearity, which increases the cost of the terminal and drains the battery faster. SC-FDMA solves this problem by grouping together the resource blocks in a way that reduces the need for linearity, and power consumption, in the power amplifier. A low PAPR also improves coverage and the cell-edge performance.

In the uplink (or "UL"), there are three physical channels. While the Physical Random Access Channel (PRACH) is only used for initial access and when the UE is not uplink synchronized, all the data is sent on the Physical Uplink Shared Channel (PUSCH). If there is no data to be transmitted on an uplink for a UE, control information is transmitted on the Physical Uplink Control Channel (PUCCH). Supported modulation formats on the uplink data channel are QPSK, 16QAM and 64QAM.

A UE may be within the coverage of multiple eNBs. One of these eNBs may be selected to serve the UE. The serving eNB may be selected based on various criteria such as received power, path loss, signal-to-noise ratio (SNR), etc. A UE may operate in a dominant interference scenario in which the UE may observe high interference from one or more interfering eNBs. A dominant interference scenario may occur due to restricted association. For example, in FIG. 1, UE $120y$ may be close to femto eNB $110y$ and may have high received power for eNB $110y$. However, UE $120y$ may not be able to access femto eNB $110y$ due to restricted association and may then connect to macro eNB $110c$ with lower received power (as shown in FIG. 1) or to femto eNB $110z$ also with lower received power (not shown in FIG. 1). UE $120y$ may then observe high interference from femto eNB $110y$ on the downlink and may also cause high interference to eNB $110y$ on the uplink.

In a dominant interference scenario where the UE experiences interference from a neighboring cell, a partitioning of resources by time may help to reduce interference. In one example, a particular cell (e.g., $102c$ of FIG. 1) silences itself on periodic subframes, thereby allowing users from a neighbor cell (e.g., $102y$ or $102b$) to be served without interference from the particular cell. From the point of view of users experiencing significant interference, such Time Division Multiplexing (TDM) partitioning technique creates two classes of subframes. The first class includes those subframes that fall within the periodic silences and are referred to herein for convenience as "protected" or "clean" subframes (such as U/AU subframes). The subframes that are not protected (such as N/AN subframes), and may therefore experience more interference, are referred to herein as "unprotected" or "unclean" subframes.

Common subframes (such as C/AC subframes) have a channel quality dependent on the number of neighbor eNBs transmitting data. For example, if neighbor eNBs are transmitting data on the common subframes, the channel quality of the common subframes may also be lower for extended boundary (EBA) UEs strongly affected by aggressor eNBs. An EBA UE may belong to a first eNB but also be located in the coverage area of a second ENodeB. For example, a UE communicating with a macro eNB that is near the range limit of a femto eNB coverage is an EBA UE.

In one heterogeneous network scenario, a macro UE under femto coverage may experience significant downlink (DL) interference. As explained above, TDM partitioning of resources allows a UE under high interference from a neighbor cell to maintain good downlink signal quality towards the serving cell. Nevertheless, even if its downlink channel is protected, the macro UE in femto coverage may be power limited on the uplink (UL).

One outage scenario includes a large macro site to site distance, and a Closed Subscriber Group (CSG) in which a user adds a femto. A non-CSG user has good downlink coverage on protected subframes but not very good uplink coverage due to limited transmit power at the UE and higher interference. It should be noted in this example that uplink transmit Power Spectral Density (PSD) is constrained by a minimum Signal to Interference Noise Ratio (SINR) specification at the receiver of the eNB and a maximum transmit power of the UE. Hence uplink transmit bandwidth may become very small resulting in a power limited UE that uses only a fraction of its protected subframes. Therefore, available protected subframes may not be sufficient to support Quality of Service (QoS) requirements of the UE. Also, there may be waste because the unused physical resource blocks in the protected subframes, by definition, cannot be used by the femto cell either.

Such problem is addressed by examples provided herein. Certain aspects disclosed herein provide for Frequency Division Multiplexing (FDM) of uplink resources in addition to Time Division Multiplexing (TDM) of downlink resources. Such aspects are not limited to, though certainly applicable to, those scenarios where a UE serviced by a first eNB receives significant interference from a second eNB. Various aspects include a first eNB negotiating with a second eNB for the second eNB to yield subbands in otherwise unprotected uplink subframes for use by the UE.

In some designs, the first eNB is a macro eNB, and the second eNB is a femto eNB, though the scope of designs is not so limited, as such concept can be applied to any two or more eNBs that may interfere with one or more UEs. The following examples refer to a macro eNB and a femto eNB, though it is understood that the concept applies generally.

Some aspects provide a technique to allocate resources to the UE where waste is reduced by extending the concept of protected and unprotected resources to particular subbands within Physical Resource Blocks (PRBs) of the femto cell. In one example, the femto cell and the macro cell UEs communicate on uplink in a pattern according to the following vectors:

femto [N, AN, AC, AC, AC, AU, AU, U],
macro [U, AU, AC, AC, AC, AN, AN, N].

In such vectors, N and AN are unprotected subframes (not used by the macro cell), U and AU are protected subframes (used by the macro cell and yielded by the femto cell), and AC are common subframes (used by both cells). With a link budget deficit due to a power limitation, the macro UE receiving interference from the femto cell might otherwise be scheduled only on macro U/AU subframes. Due to the power constraints, the available U/AU subframes may be inadequate to close the link on the uplink. The design of this example, however, ameliorates such problem by allowing the macro cell to request additional PRBs for uplink transmission. Specifically, different subbands within the uplink subframes are assigned different vectors so that protected resources can be assigned to the macro. After negotiation, the macro cell has additional protected PRBs in which it can schedule the UE for uplink communications. In one aspect, scheduling of UE uplink communications is performed by transmitting configuration signaling information that indicates a partitioning of subband resources, such as control channel assignment.

In one aspect, the two eNBs negotiate, e.g., over upper layer signaling such as across an X2 interface, to assign the different vectors to the different subbands on the uplink. The two eNBs may negotiate a set of vectors the same as, or similar to, the following:

Macro downlink vector: [U, AU, AU, AC, AC, AC, AC, AC]
Femto downlink vector: [NT, AN, AN, AC, AC, AC, AC, AC]
Macro uplink vectors:
subband 1: [AC, AC, AC, AC,U, AU, AU, AU]
subband 2: [AC, AC, AC, AC, U, AC, AC, AC]
Femto uplink vectors:
subband 1: [AC, AC, AC, AC, N, AN, AN, AN]
subband 2: [AC, AC, AC, AC N, AC, AC, AC]

With respect to the uplink, it is noted that the last four subframes of subband 1 are protected for the macro UE, whereas the femto UEs do not use the last four subframes in subband 1. For subband 2, the fifth subframe is protected for the macro UE, whereas the other seven subframes are common and can be used by any of the UEs.

In LTE release 8, the downlink control assignments (on the PDCCH) are typically offset from the corresponding uplink transmissions (on the PUSCH) by four subframes. For instance, in release 8 some designs might assign a protected uplink resource using a PDCCH sent four subframes before the uplink subframe (n−4, where n is the uplink subframe). Also, in release 8, the PHICH is transmitted 4 subframes after the uplink subframes (n+4 on downlink, where n is the uplink subframe). In some instances, however, where the uplink is partitioned according to an FDM technique, a protected uplink may not always map to a protected downlink subframe at n−4 or n+4. Thus, various aspects include techniques to assign control channels, such as the PDCCH and PHICH, so that those control channels see reduced or minimal interference.

Figure 4:
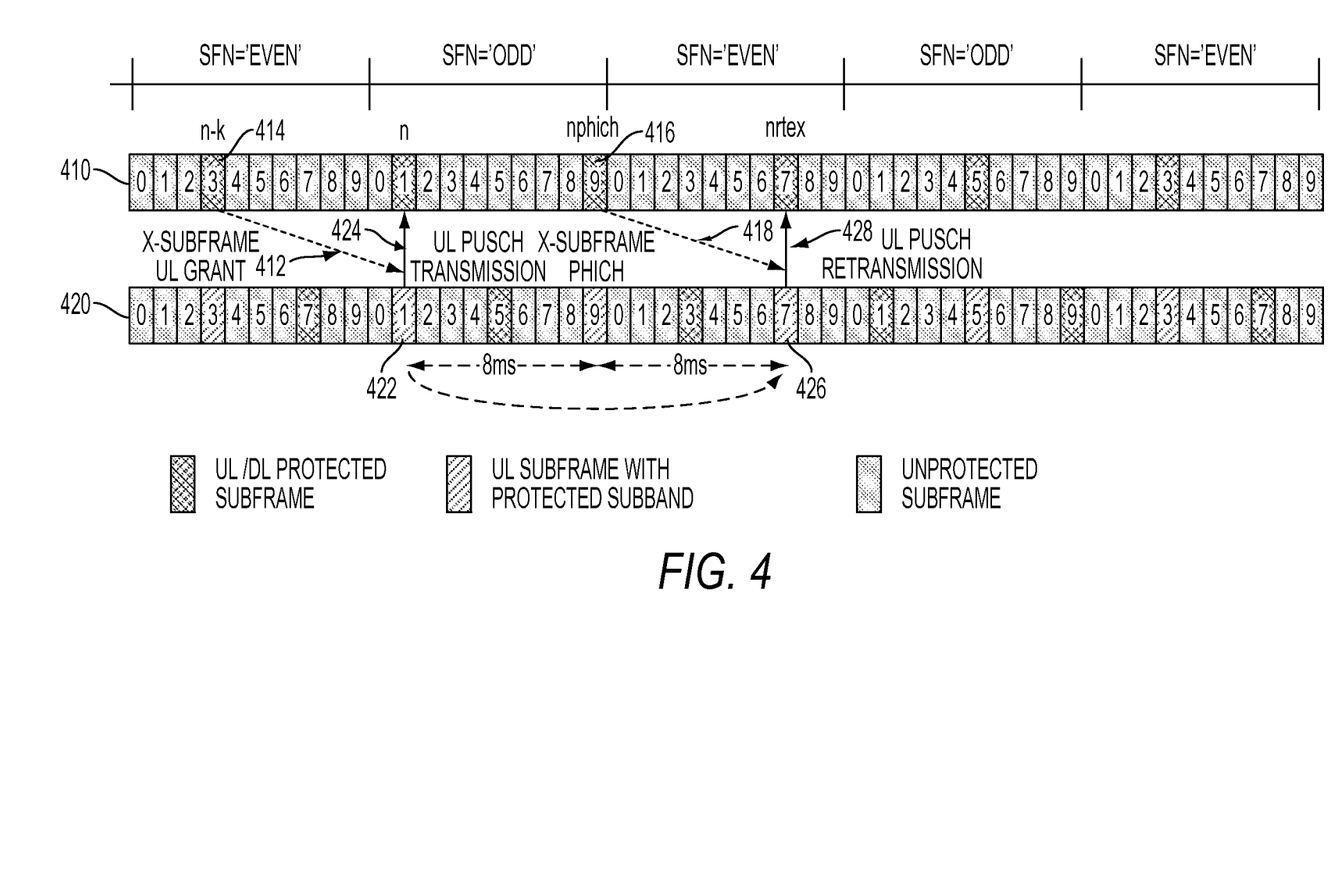
FIG. 4 is an illustration showing example timelines of subframes according to one aspect of the present disclosure.

FIG. 4 is an illustration of exemplary downlink and uplink timelines 410, 420, respectively, of subframes for a UE and an eNB according to one aspect. The example of FIG. 4 includes a few changes to the release 8 timeline because of the cross-subframe assignment mode described above. Odd and even radio frame numbers are shown.

In one example design, the PDCCH is sent in a protected downlink subframe n1=n−k, k>4 when n−4 is not protected. When a control signal is scheduled for a subframe different from it usual subframe, such technique is referred to herein as a "cross-subframe" assignment mode. The PDCCH can be scrambled by a UE-specific Cross-subframe Radio Network Temporary Identifier (X-RNTI) for cross-subframe assignment. As shown in FIG. 4, in one aspect X-subframe uplink grant 412 is sent in protected downlink subframe 414. In response, a UE may perform an uplink data transmission 424 in protected uplink PUSCH transmission subframe 422.

Continuing with this example design, the PHICH for X-RNTI shall be sent on protected subframe nphich=n−k+8*N, where N is the smallest integer such that nphich>=n+4. In one aspect, FIG. 4 illustrates that X-subframe PHICH 418 is sent in protected downlink subframe 416 (nphich). The macro UE monitors the PHICH sent in this location instead of n+4. Also, if a NACK is received, retransmission may occur in subframe nretx=n+8*M, where M is the smallest integer such that nretx>=nphich+4. The cross-subframe assignment mode can be switched on by higher layer signaling. Representatively, uplink PUSCH retransmission 428 occurs on protected uplink frame 426 (nretx), as shown in FIG. 4.

In another example design, rather than using cross subframe scheduling, the wireless network uses protected subbands within otherwise unprotected subframes on the PDSCH for signaling. In such examples, the UE is notified to listen to the relay signaling for uplink assignments. In one aspect, a Relay-PDCCH (R-PDCCH) is sent on the PDSCH protected resources, and the macro UE monitors the R-PDCCH for possible uplink allocations on non-protected downlink subframes. Other protected resources can be used for ACK/NACK signals, such as a Relay-PHICH (R-PHICH) sent in a protected subband of the PDSCH. The channels (R-R-PDSCH and R-PHICH) are shown in FIG. 2.

In yet another example, Semi-Persistent Scheduling (SPS) allocations can be used to avoid control signaling on non-protected subframes for various applications, such as Voice over IP (VoIP). VoIP is an appropriate example, because its uplink requirements are typically known in advance, and once protected vectors are assigned, there is generally no need to use further signaling to assign protected resources in the uplink.

VoIP transmissions have a 20 ms time period. In one aspect, some designs protect uplink transmissions on 0 ms, 20 ms, 40 ms, 60 ms . . . for VoIP. However, the vectors are defined with period of eight milliseconds. Thus, a system may take into account the period of the uplink transmissions, the period of the vector timelines, and the offset between the uplink and downlink vectors to schedule the beginning of the VoIP uplink transmissions on protected resources. In this example, U and AU are configured in such a way that the macro UE protected uplink resources are assigned as shown below:

downlink vector: [U, AC, AC, AC, AC, AC, AC, AC]
uplink vector for subband 1 or 2: [AC, AC, AC, U, AC, AC, AC, AU]

As shown above, the last subframe in the uplink vector is changed to AU, and the vector is repeated for as long as is desired, thereby ensuring that every fourth subframe in the uplink vector is protected (i.e., is either a U or an AU). Accordingly, each uplink transmission on 0 ms, 20 ms, 40 ms, 60 ms is protected. Once the vectors are assigned, the periodic and predictable nature of VoIP means that signaling may not be needed for further uplink assignments, at least for the VoIP session. Therefore, some control signaling can be avoided such that control signaling interference is reduced or kept to a minimum.

The PHICH transmissions can be facilitated in at least one of two ways. In one way, a cross-subframe PHICH is sent on protected downlink subframes, as described above. Such a technique may use a four-subframe PHICH delay for transmissions occurring in the AU subband.

In another design, the PHICH is transmitted only on downlink protected subframes, and the PHICH is received only for packets transmitted on uplink protected subframes. No PHICH is transmitted for packets sent on protected subbands of otherwise unprotected subframes. The first transmission error rate, however, should be low because 1) a protected uplink subframe was used for the data transmission, and 2) SPS normally operates on a conservative Modulation and Coding Scheme (MCS).

The example above uses VoIP to illustrate the concept of SPS for use in some aspects, though the scope of designs is not so limited. Any application suitable for use with SPS can be used in various designs.

In the example above, new signaling may be added to that which is already provided by LTE Release 8. For instance, some aspects include messages between the macro cell and the femto cell for negotiating use of subbands in the uplink. The signaling may be in upper layers.

Figure 5:
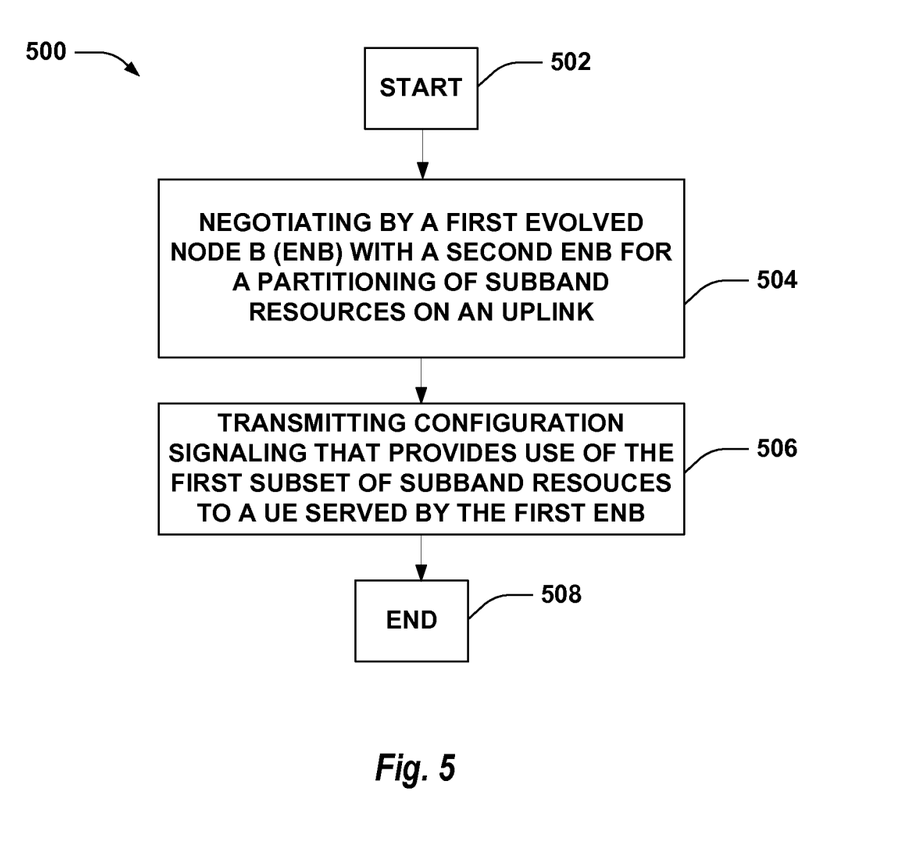
FIG. 5 shows an exemplary operational flow diagram according to one aspect of the present disclosure.

FIG. 5 shows an exemplary process 500 for a first eNB, where a User Equipment (UE) serviced by the first eNB experiences interference from a second eNB. The process 500 begins at block 502. In block 504, the first eNB negotiates with the second eNB for a partitioning of subband resources on an uplink. In one example, a first subset of subband resources is assigned to the first eNB, and a second subset of subband resources is assigned to the second eNB.

In block 506 configuration signaling provides use of the first subset of subband resources to a UE served by the first eNB. The signaling may include new signaling to that which is already provided by LTE Release 8 or may include techniques known in Release 8 without modification. In one example, a cross-subframe assignment mode is used for the PDCCH transmissions, and the PHICH timing is moved as well. In another example, the PDCCH is sent on protected subframes of otherwise unprotected PDSCH transmissions (as might be performed with relay devices). In yet another example, SPS is used to eliminate some signaling. The process 500 ends at block 508.

Figure 6:
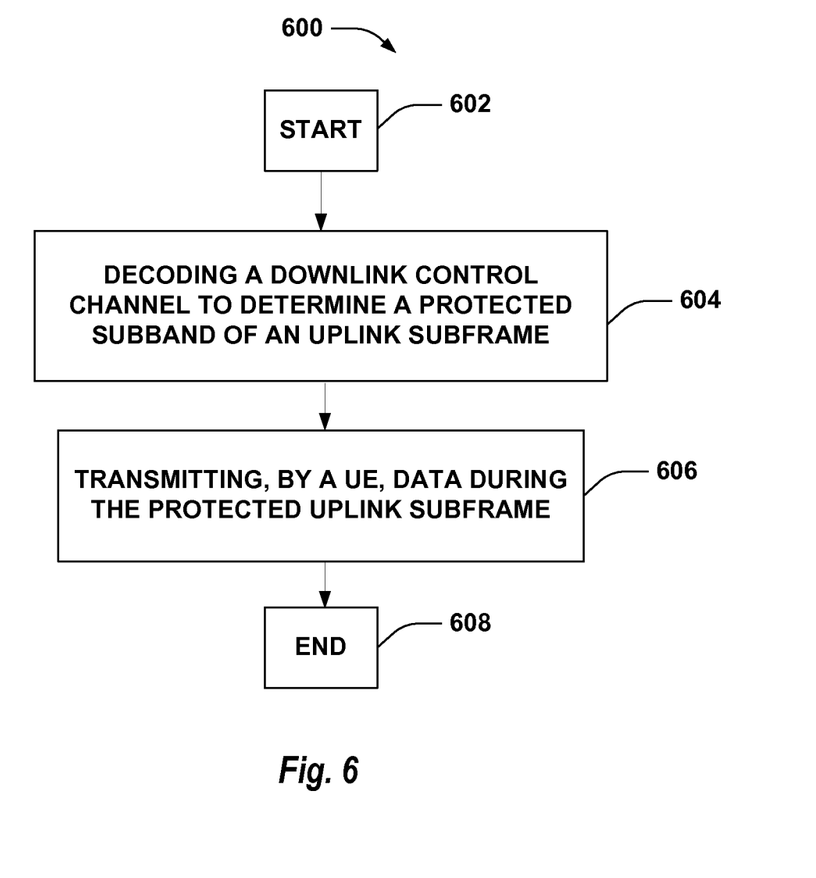
FIG. 6 shows an exemplary operational flow diagram according to one aspect of the present disclosure.

FIG. 6 shows an exemplary process 600 for a User Equipment (UE) serviced by the first eNB that experiences interference from a second eNB. The process 600 begins at block 602. In block 604, the UE reads a downlink control channel to determine a protected subband of an uplink subframe n. In block 606, the UE transmits data during the detected uplink subframe n. The process 600 ends at block 608.

The functional blocks and modules disclosed herein may comprise processors, electronics devices, hardware devices, electronics components, logical circuits, memories, software codes, firmware codes, etc., or any combination thereof.

Various aspects may include advantages over conventional designs. For instance, the macro UE, which otherwise would have poor uplink performance, is provided reliable uplink resources even when the macro UE is power-constrained. From the femto cell's point of view, it loses some PRBs in its AC subframes, but performance loss is relatively small because other PRBs in those subframes are still available for use by the femto cell.

Figure 7:
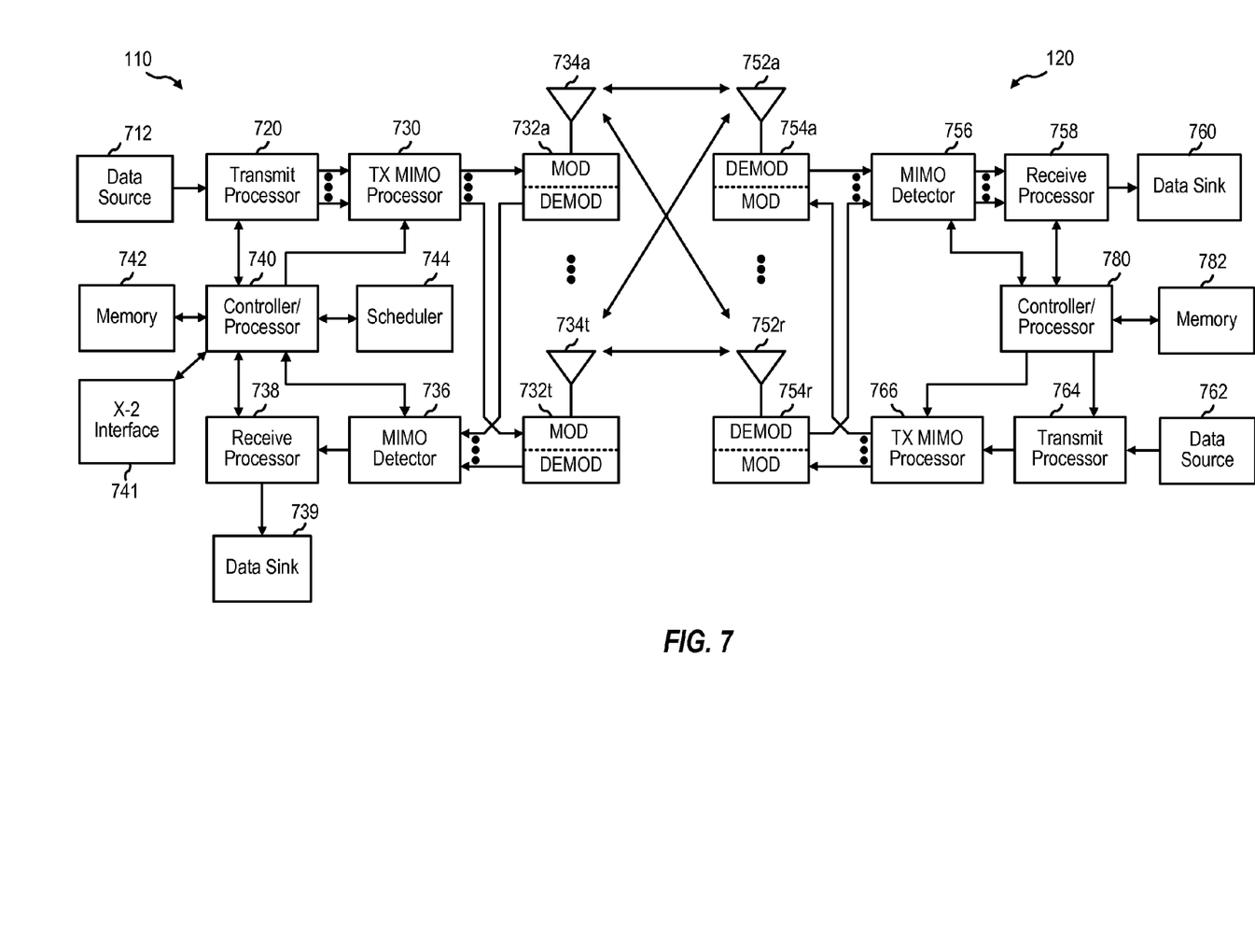
FIG. 7 shows a block diagram of a design of a base station/eNB and a UE, which may be one of the base stations/eNBs and one of the UEs in FIG. 1.

FIG. 7 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 734a through 734t, and the UE 120 may be equipped with antennas 752a through 752r.

At the base station 110, a transmit processor 720 may receive data from a data source 712 and control information from a controller/processor 740. The control information may be for the PBCH, PCFICH, PHICH, PDCCH, etc. The data may be for the PDSCH, etc. The processor 720 may process (e.g., encode and symbol map) the data and control information to obtain data symbols and control symbols, respectively. The processor 720 may also generate reference symbols, e.g., for the PSS, SSS, and cell-specific reference signal. A transmit (TX) multiple-input multiple-output (MIMO) processor 730 may perform spatial processing (e.g., precoding) on the data symbols, the control symbols, and/or the reference symbols, if applicable, and may provide output symbol streams to the modulators (MODs) 732a through 732t. Each modulator 732 may process a respective output symbol stream (e.g., for OFDM, etc.) to obtain an output sample stream. Each modulator 732 may further process (e.g., convert to analog, amplify, filter, and upconvert) the output sample stream to obtain a downlink signal.

Downlink signals from modulators 732*a* through 732*t* may be transmitted via the antennas 734*a* through 734*t*, respectively.

At the UE 120, the antennas 752*a* through 752*r* may receive the downlink signals from the base station 110 and may provide received signals to the demodulators (DEMODs) 754*a* through 754*r*, respectively. Each demodulator 754 may condition (e.g., filter, amplify, downconvert, and digitize) a respective received signal to obtain input samples. Each demodulator 754 may further process the input samples (e.g., for OFDM, etc.) to obtain received symbols. A MIMO detector 756 may obtain received symbols from all the demodulators 754*a* through 754*r*, perform MIMO detection on the received symbols if applicable, and provide detected symbols. A receive processor 758 may process (e.g., demodulate, deinterleave, and decode) the detected symbols, provide decoded data for the UE 120 to a data sink 760, and provide decoded control information to a controller/processor 780.

On the uplink, at the UE 120, a transmit processor 764 may receive and process data (e.g., for the PUSCH) from a data source 762 and control information (e.g., for the PUCCH) from the controller/processor 780. The processor 764 may also generate reference symbols for a reference signal. The symbols from the transmit processor 764 may be precoded by a TX MIMO processor 766 if applicable, further processed by the demodulators 754*a* through 754*r* (e.g., for SC-FDM, etc.), and transmitted to the base station 110. At the base station 110, the uplink signals from the UE 120 may be received by the antennas 734, processed by the modulators 732, detected by a MIMO detector 736 if applicable, and further processed by a receive processor 738 to obtain decoded data and control information sent by the UE 120. The processor 738 may provide the decoded data to a data sink 739 and the decoded control information to the controller/processor 740.

The controllers/processors 740 and 780 may direct the operation at the base station 110 and the UE 120, respectively. The processor 740 and/or other processors and modules at the base station 110 may perform or direct the execution of functional blocks illustrated in FIG. 5 and processes for the techniques described herein. The processor 780 and/or other processors and modules at the UE 120 may also perform or direct the execution of the functional blocks illustrated in FIG. 6, and/or other processes for the techniques described herein. The memories 742 and 782 may store data and program codes for the base station 110 and the UE 120, respectively. A scheduler 744 may schedule UEs for data transmission on the downlink and/or uplink. An X-2 interface 741 enables the base station 110 to communicate with other base stations.

In one configuration, the eNodeB 110 is configured for wireless communication including means for negotiating. In one aspect, the negotiating means may be the controller/processor 740, X-2 interface 741, and memory 742 (see, FIG. 7) configured to perform the functions recited by the negotiating means. The eNodeB 110 is also configured to include a means for communicating. In one aspect, the communicating means may be the controller/processor 740, transmit processor 720, receive processor 738, memory 742, scheduler 744, antenna 734*a-t*, and modulator/demodulator 732*a-t* configured to perform the functions recited by the communicating means. In another aspect, the aforementioned means may be a module or any apparatus configured to perform the functions recited by the aforementioned means.

In one configuration, the UE 120 is configured for wireless communication including means for decoding a downlink control channel received during a protected downlink subframe to determine an uplink subframe n containing a protected subband for uplink transmission. In one aspect, the decoding means may be the controller/processor 780 and memory 782 (see, FIG. 7) configured to perform the functions recited by the decoding means. The UE 120 is also configured to include a means for transmitting data during the uplink subframe n on the protected subband. In one aspect, the transmitting means may be the controller/processor 780, memory 782, transmit processor 764, modulator 754*a-r*, and antenna 752*a-r* configured to perform the functions recited by the transmitting means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for communication in a wireless network, the method comprising:
   negotiating by a first base station of the wireless network with a second base station of the wireless network for a protected subband resources of a subframe on an uplink; and
   scheduling a using a cross-subframe assignment, a user equipment (UE) for an uplink transmission on the protected subband resources of the subframe based at least in part on the negotiating, wherein the cross-subframe assignment is based at least in part on an identifier associated with the UE.

2. The method of claim 1, wherein the subframe on the uplink is an unprotected subframe.

3. The method of claim 1, wherein scheduling the UE for the uplink transmission comprises signaling the protected subband resources of the subframe to the UE via a downlink control channel.

4. The method of claim 3, wherein the downlink control channel is transmitted on protected resources on an downlink subframe.

5. The method of claim 4, wherein the protected resources comprises a relay-physical downlink control channel (R-PDCCH).

6. An apparatus for communication in a wireless network, the apparatus comprising:
   a memory; and
   at least one processor coupled to the memory and configured to:
      negotiate by a first base station of the wireless network with a second base station of the wireless network for a protected subband resources of a subframe on an uplink; and
      schedule a using a cross-subframe assignment, a user equipment (UE) for an uplink transmission on the protected subband resources of the subframe based at least in part of the negotiating, wherein the cross-subframe assignment is based at least in part on an identifier associated with the UE.

7. The apparatus of claim 6, wherein the subframe on the uplink is an unprotected subframe.

8. The apparatus of claim 6, wherein scheduling the UE for the uplink transmission comprises signaling the protected subband resources of the subframe to the UE via a downlink control channel.

9. The apparatus of claim 8, wherein the downlink control channel is transmitted on protected resources on an downlink subframe.

10. The method of claim 9, wherein the protected resources comprises a relay-physical downlink control channel (R-PDCCH).

11. A method 1, wherein the identifier comprises:
   a temporary identifier assigned by one of the first base station or the second base station.

12. The method of claim 6, wherein the identifier comprises:
   a temporary identifier assigned by one if the first base station or the second base station.

* * * * *

UNITED STATES PATENT AND TRADEMARK OFFICE
CERTIFICATE OF CORRECTION

PATENT NO. : 9,629,123 B2
APPLICATION NO. : 14/226334
DATED : April 18, 2017
INVENTOR(S) : Madhavan Srinivasan Vajapeyam et al.

Page 1 of 1

It is certified that error appears in the above-identified patent and that said Letters Patent is hereby corrected as shown below:

On the Title Page (62) should read:
Division of application No. 13/110,280, filed on May 18, 2011, now Pat. No. 8,761,097.
Provisional application No. 61/346,127, filed on May 19, 2010.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*